US006933457B2

(12) United States Patent
Boccadoro et al.

(10) Patent No.: US 6,933,457 B2
(45) Date of Patent: Aug. 23, 2005

(54) METHOD AND APPARATUS FOR ELECTRICAL DISCHARGE MACHINING OF A WORKPIECE

(75) Inventors: Marco Boccadoro, Versio (CH); Reto Knaak, Ascona (CH); Stefano Bonini, Brissago (CH)

(73) Assignee: Agie SA, Losone (CH)

( * ) Notice: Subject to any disclaimer, the term of this patent is extended or adjusted under 35 U.S.C. 154(b) by 7 days.

(21) Appl. No.: 10/801,261

(22) Filed: Mar. 16, 2004

(65) Prior Publication Data

US 2004/0222195 A1 Nov. 11, 2004

(30) Foreign Application Priority Data

Apr. 2, 2003 (EP) ............................................. 03007411

(51) Int. Cl.⁷ .............................. B23H 1/02; B23H 7/16
(52) U.S. Cl. ................................ 219/69.19; 219/69.18; 219/69.13
(58) Field of Search .......................... 219/69.13, 69.16, 219/69.18, 69.19

(56) References Cited

U.S. PATENT DOCUMENTS

| | | | | |
|---|---|---|---|---|
| 4,072,842 A | * | 2/1978 | Ullmann et al. .......... | 219/69.13 |
| 4,700,038 A | | 10/1987 | Dauw ....................... | 219/69.18 |
| 4,800,248 A | * | 1/1989 | Futamura et al. ........ | 219/69.18 |
| 5,187,341 A | | 2/1993 | Graell ...................... | 219/69.13 |
| 5,280,153 A | | 1/1994 | Bühler ..................... | 219/69.18 |

FOREIGN PATENT DOCUMENTS

| | | |
|---|---|---|
| DE | 28 41 596 | 3/1980 |
| EP | 368 833 A1 | 5/1990 |
| RU | 308846 | 7/1971 |
| RU | 399335 | 10/1973 |
| WO | WO 01/32342 A1 | 5/2001 |

OTHER PUBLICATIONS

"High–Frequency Transistor Generators for EDM", Otto et al., International Symposium for Electromachining, Jun. 21–24, 1977, pp. 69–71.
"Theoretical Models of the Electrical Discharge Machining Process. I. A Simple Cathode Erosion Model", DiBitonto et al., Journal of Applied Physics, vol. 66, No. 9, Nov. 1, 1989.
"Theoretical Models of the Electrical Discharge Machining Process. II. The Anode Erosion Model", Patel et al., Journal of Applied Physics, vol. 66, No. 9, Nov. 1, 1989.
"Elektronische Stromquelle für das funkenerosive Schneiden von elektrisch schlecht leitfähigen Werkstoffen, Otto–von–Guericke–Universität Magdeburg", Dissertation, 1996, pp. 30–38, pp. 87–89.
"Fertigungsverfahren, Abtragen und Generieren", König et al., 1997, pp. 1–85.
"Funkenerosive Senkbearbeitung mit leistungssteigernden Elektrodenwerkstoffen und Arbeitsmedien", Karden, Shaker Verlag, Band Feb. 2001, pp. 48–63.
Search Report in EP 03 007 411.6 dated Sep. 16, 2003.
"On–Line Identification and Optimization of Electro–Discharge Machining", Snoeys et al., Katholieke Universiteit Leuven, 1985, pp. 1 through A–24.
Translation of Soviet Union Inventor's Certificate No. 308, 846, no pub date.
Translation of Soviet Union Inventor's Certificate No. 399, 335, no pub date.

* cited by examiner

*Primary Examiner*—Geoffrey S. Evans
(74) *Attorney, Agent, or Firm*—Marshall, Gerstein & Borun LLP (57) ABSTRACT

A method and apparatus for electrical discharge machining of a workpiece wherein an erosion pulse is applied on the tool electrode. During the time of the erosion pulse the voltage ($U_e$) set on the electrode is acquired, and the erosion pulse is interrupted, after an asymptotic behavior of the acquired voltage ($U_e$) or a value derived therefrom has been acquired. Before the interruption of the erosion pulse an increase of current may occur.

17 Claims, 4 Drawing Sheets

METHOD AND APPARATUS FOR ELECTRICAL DISCHARGE MACHINING OF A WORKPIECE

FIELD OF THE DISCLOSURE

The disclosure is directed generally to a method and apparatus for machining of a workpiece and, more particularly, to a method and apparatus for electrical discharge machining of a workpiece with a tool electrode.

RELATED TECHNOLOGY

One of the main difficulties with electrical discharge machining lies in the optimization of the removal rate on one hand, and the surface quality of the workpiece to be machined on the other. The machined workpiece must exhibit a desired final roughness and a precise shape. Further, minimization of the size of the heat affected zone of the workpiece surface and possible electrode wear are desired. These boundary conditions determine the machining time and thus the cost of completing a workpiece.

Figure 1A:
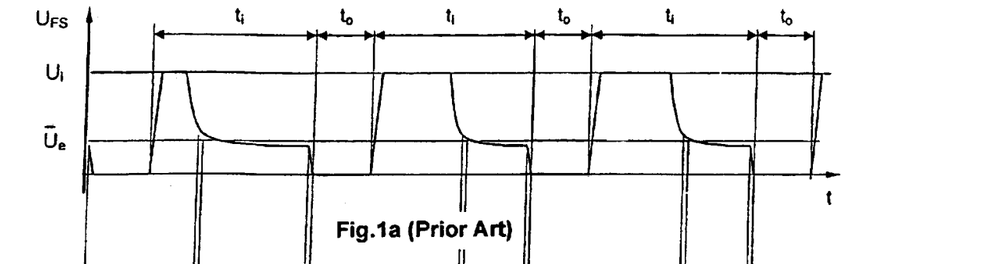

In electrical discharge machining an electrical discharge generator supplies series of controlled erosion pulses to a tool electrode and the workpiece, allowing the electrical discharge process. According to the state of the art the following kinds of pulse series are customary:

Iso-frequent pulse series, as shown for example in FIG. 1a. The course in time of the voltage ($U_{FS}$) applied to the workpiece is represented by three consecutive erosion pulses. Characteristically an increase of voltage up to a given idle voltage $U_i$, a continuation of the constantly held idle voltage $U_i$ until the erosion pulse ignites, a drop of voltage during the discharge (with a mean discharge voltage $U_e$), and an interruption of the discharge with a drop of voltage to zero are observed. An erosion pulse of duration $t_i$ is followed by an interpulse period $t_o$, before a new erosion pulse is generated.

Figure 1B:
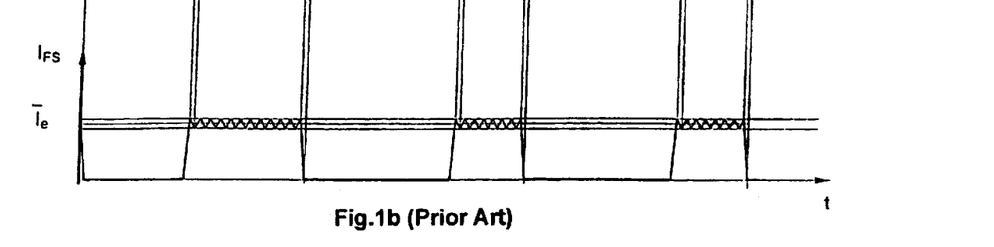

FIG. 1b shows the pertinent course of a current $I_{FS}$ that flows to the tool electrode during an erosion pulse. This current rises during the discharge up to a constantly held mean discharge current $I_e$ and drops toward the end of the erosion pulse down to zero. With iso-frequent pulse series the pulse duration $t_i$ and the duration of the interpulse period $t_o$ are kept constant. With this method the stochastic behavior of the ignition delay time (the time between the set idle voltage $U_i$ and the increase of current respectively the drop of idle voltage) changes the discharge energy (the discharge rate is also kept constant) for each electrical pulse, and therefore the removal of material, the relative wear, and the final roughness.

Figure 2A:
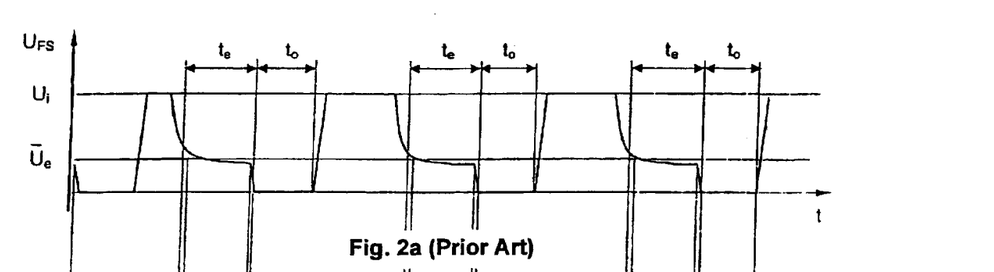
Figure 2B:
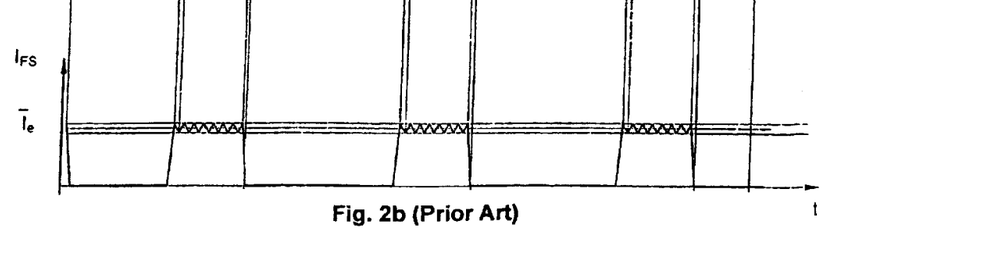

Iso-energetic pulse series, as shown for instance in FIGS. 2a and b, in which the discharge time $t_e$ and the interpulse period $t_o$ are kept constant. Here a better uniformity of the technical results is obtained. In comparison with iso-frequency machining, iso-energetic machining results in a lower removal rate, because fewer erosion pulses are used per unit of time.

Furthermore, with the state of the art of electrical discharge machining of workpieces, rectangular or trapezoidal electrical pulses are customary. Trapezoidal electrical pulses have the advantage that, because of lower current density during the set-build-up phase of the discharge channel, electrode wear is lower, but also the disadvantage that the removal rate is lower because of the lower current-time-integral.

PCT publication WO 01/32342 discloses an attempt to eliminate the disadvantages of the machining with trapezoidal electrical pulses by connecting, after a predetermined time from the beginning of the discharge, a supplementary current generator that superimposes a very short, triangular current pulse of high energy to the normal current pulse. The pre-determined time is established empirically and serves to lower the current density, in order to keep the electrode wear low. However, in this case, especially in hard metal machining, the removal can be augmented, but it is not possible to lower the electrode wear at the same time as with each electrical pulse there are other conditions. Because the erosion process is stochastic, the current density for each current pulse follows its own gradient. Further the usage of a supplementary generator is complex and more expensive.

SUMMARY OF THE DISCLOSURE

The disclosure provides an improved method and apparatus for electrical discharge machining of workpieces.

According to a first aspect, the disclosure provides a method for electrical discharge machining of a workpiece upon which an erosion pulse is applied on the tool electrode, which voltage is acquired during the length of the erosion pulse. After having registered an asymptotic behavior of the acquired voltage or of a value derived therefrom, such as discharge energy or the ratio between acquired voltage and current, for example, the erosion pulse is interrupted.

According to a second aspect, the disclosure provides an apparatus for electrical discharge machining of a workpiece with an electrical discharge generator producing erosion pulses to be applied on the tool electrode. The electrical discharge generator acquires the voltage applied on the workpiece during the period of an erosion pulse applied on the tool electrode. A device connected to the electrical discharge generator causes the electrical discharge generator to interrupt an erosion pulse, after detecting an asymptotic behavior of the acquired voltage or a value derived therefrom.

BRIEF DESCRIPTION OF THE DRAWINGS

The disclosed method and apparatus are described in more detail by means of preferred embodiments with regard to the accompanying drawings.

FIG. 1 is a diagram of voltage in time(FIG. 1a) and associated current in time (FIG. 1b) of an iso-frequent current pulse series according to the prior art;

FIG. 2 is a diagram of voltage in time (FIG. 2a) and associated current in time (FIG. 2b) of an iso-energetic current pulse series according to the prior art;

FIG. 3 is a diagram of voltage in time (FIG. 3a), an associated diagram of the derivative of voltage in time (FIG. 3b) and an associated diagram of current in time(FIG. 3c) of an iso-geometrical current pulse according to the disclosure;

DETAILED DESCRIPTION

For a better understanding of the disclosure and of the technical terms used for its description, the general principle of electrical discharge machining is described hereinafter in FIGS. 1 and 2, showing diagrams of voltage $U_{FS}$ and its associated current $I_{FS}$ for erosion pulse series according to the state of the art.

Electrical discharge machining of workpieces includes the erosion of electrically conducting materials by an electrical discharge process between two electrodes (the workpiece and a tool electrode) in a working medium (dielectric fluid). The erosion is caused by discharges (sparks) that are not stationary, and are separated from one another in space and time. The workpiece and the tool electrode are put into a working position such that a working gap is defined between them. When the electrodes are provided with electrical voltage (as a sequence of erosion pulses), after exceeding the dielectric strength of the working fluid—set by the gap width and the electric conductivity of the dielectric fluid—a discharging channel of high energy is formed. Adequate electrical discharge generators supply the energy necessary to generate the erosion pulses. The state of the art typically uses static pulse generators.

The physical discharge process, leading to the removal of material, is divided into three consecutive main phases, i.e., the build-up phase, the discharge phase, and the reduction phase. In the following description of these three phases it is assumed that erosion pulses with positive voltage are applied on the tool electrode, which thus acts as an anode. The disclosure also applies to other erosion processes in which, for instance, negative erosion pulses are applied.

During the build-up phase a discharge channel is developed between the two electrodes. From the electrical discharge generator an erosion pulse, with a set voltage value, is applied on the electrodes. The so-called idle voltage $U_i$ appears as a maximum value on the discharge gap when there is still no current $I_{FS}$ flowing through the discharge channel. The set idle voltage $U_i$ determines, inter alia, the gap width at which a discharge can ignite.

After a so-called ignition delay, a current $I_e$ flows almost exclusively on the surface shell of the discharge channel and the anode is partially evaporated by electron bombardment, whereby the principal wear of the electrode takes place. The tool electrode (acting as an anode) mainly takes energy from the negative electrons accelerated in the electrical field of the discharge gap. These have a comparably small mass and are thus accelerated in a relatively short period of time.

In the discharging phase the electrical energy supplied by the electrical discharge generator leads to evaporation of material, mainly on the workpiece. The discharge phase is characterized by a time-dependent discharge voltage, which appears in the discharge gap when the discharge ignites and the corresponding discharge current $I_e$ flows. Very often a medium discharge voltage $U_e$ is defined, which depends on the combination of materials and, in most cases, lies between 15 V and 30 V.

The discharge current $I_e$ can be regulated on the generator to a preset value. Often a working voltage is also defined as arithmetic average value of the voltage set on the discharge gap during machining, and a working current as the arithmetic average value of the discharge current $I_e$ flowing through the discharge gap. Working voltage and working current are two measured variables which are used for the setting and monitoring of the erosion process. The discharge energy is the energy which is converted in the discharge gap during a discharge. It determines the volume of the single discharges and further also the structure of the eroded surface.

The reduction phase starts by switching off of the discharge current $I_e$. The plasma channel collapses and the partially evaporated, partially fluid material is ejected. Therefore, upon machining with positive polarity, the removal of material takes mainly place during the reduction phase.

A good erosion process requires discharge conditions in the working gap such as to possibly avoid the occurrence of short circuits, arc discharges, and idle voltage pulses. Further details with regard to spark erosion machining can be found in the publication "Fertigungsverfahren, Abtragen und Generieren" by Wilfried König—Fritz Klocke, Springer Verlag, ISBN 3-540-63201-8.

Figure 3A:
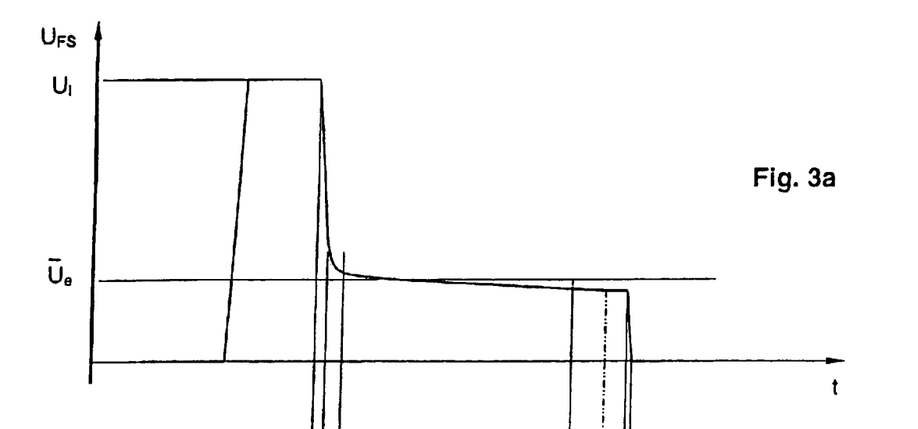
Figure 3B:
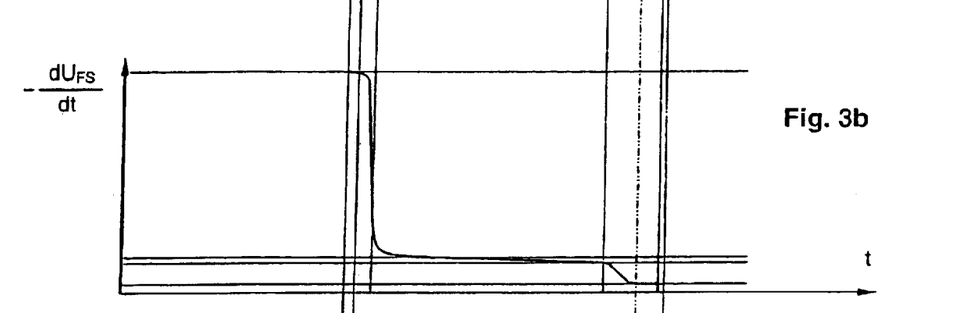
Figure 3C:
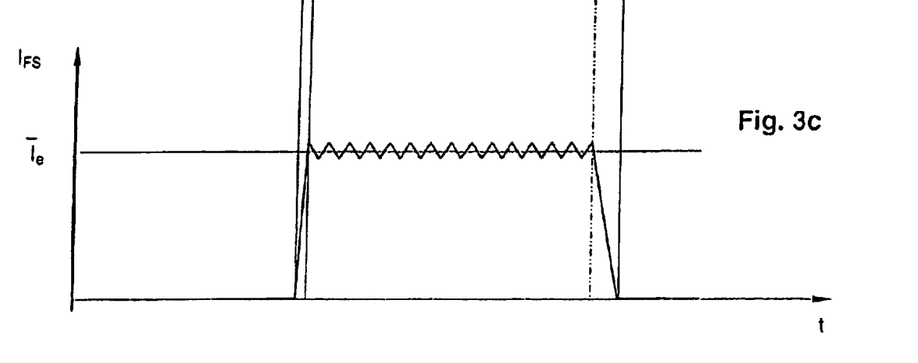

FIG. 3a is a diagram of the voltage $U_{FS}$ of an erosion pulse, FIG. 3b is the corresponding diagram of the derivative $-dU_{FS}/dt$ of the voltage course shown in FIG. 3a for the duration of the discharge phase (after the drop of idle voltage $U_i$ to the discharge voltage $U_e$), and FIG. 3c is a diagram of the corresponding current $I_{FS}$ flowing to the tool electrode.

It is known that the size of the discharge crater on the anode and on the cathode, caused by the discharge plasma, increases as a direct function of the discharge time $t_e$. After a certain time the plasma base point begins to travel on the cathode surface, causing smaller secondary craters (see Arnd Karden, "Funkenerosive Senkbearbeitung mit leistungssteigernden Elektrodenwerkstoffen und Arbeitsmedien", Band 2/2001, Shaker Verlag, ISBN 3-8265-8392-2). The roughness of the machined workpiece surface corresponds to the radius of the spark base (Daryl di Bitonto et al. "Theoretical models of the electrical discharge machining process", "I. A. simple cathode erosion model" and "II. The anode erosion model", Journal of Applied Physics, Vol. 66, 1989, No. 9, S. 4095–4111).

Because of the increase of diameter of the spark base upon an increase in discharge duration $t_e$, the current density in the plasma channel diminishes and thus does the discharge voltage between tool electrode and workpiece (see Matthias Timm, "Elektronische Stromquelle für das funkenerosive Schneiden von elektrisch schlecht leitfähigen Werkstoffen", Otto-von-Guericke-Universität Magdeburg, 1996, Dissertation, pages 30ff.).

It is possible to deduce from the discharge voltage $U_e$ at what time the diameter of the spark base will not increase further, as a thermal balance between the supplied energy and the caloric energy of the melted hemisphere supplied to the workpiece has been obtained. Furthermore, the discharge pulse need not continue, as from this moment the required roughness has been obtained. This point is reached at exactly the moment when there is an asymptotic behavior of the discharge voltage $U_e$.

In case of a constant discharge current $I_e$, the asymptotic behavior is an essentially constant discharge voltage $U_e$. When the discharge current is not constant, the asymptotic behavior of the discharge voltage $U_e$ may depend on the course of the discharge current $I_e$ over time. For instance, upon a linear increase of the discharge current $I_e$ over time the asymptotic behavior of the discharge voltage $U_e$ is also a linear increase in time, but generally with a different rate of increase.

In certain cases it might be easier to determine the asymptotic behavior from another value derived from the discharge voltage $U_e$. This derived value may, for instance, be the discharge value, which can be determined by the product of the discharge voltage $U_e$ recorded by time unit and the discharge current $I_e$ flowing by time unit. It can also be a value derived by dividing the discharge voltage $U_e$ recorded by time unit and the simultaneous discharge current $I_e$ flowing by time unit.

Generally, the term "asymptotic behavior" as used herein is understood as behavior that considers the discharge voltage $U_e$ (i.e. the derived value, such as discharge power) being in balance and having acquired an essentially maximum crater diameter with the instantaneously flowing discharge current $I_e$. Each discharge current $I_e$ has exactly one maximal crater diameter and therefore also a corresponding discharge voltage $U_e$, which may appear with a time lag. Therefore the asymptotic behavior with a discharge current $I_e$ changing in time can as well be any "complicated" behavior in time, it is therefore not limited to an asymptotic value or an asymptote (straight line).

In FIGS. 3a–3c the instant with an asymptotic behavior of the discharge voltage $U_e$ is indicated with a vertical dash-dot line. For a constant discharge current $I_e$ the asymptotic behavior is a constant discharge voltage $U_e$ in time. For instance this constancy can be determined by the derivative of the gap voltage $U_{FS}$ (respectively discharge voltage $U_e$) in time $-DU_{FS}/dt$, which mainly equals zero upon the asymptotic behavior (respectively is smaller than a given threshold value). Furthermore, shortly before the time at which the derivative becomes smaller than a given threshold value, FIG. 3 shows yet another time drawn as a continuous vertical line from which the derivative $-DU_{FS}/dt$ of the discharge voltage $U_e$ drops severely (this time can also be used to determine the attainment of the asymptotic behavior of the discharge voltage $U_e$).

For a copper/steel combination (tool electrode/workpiece) the asymptotic value of the discharge voltage $U_e$ lies for example at about 24 V. However, this value is not the same for all discharge pulses and tool electrode/workpiece combinations, as the drop in voltage above the erosion gap depends for instance on the discharge current $I_e$ and the electrode geometry. Furthermore, a known characteristic of the erosion process is its mostly stochastic character, which is due to constantly changing physical conditions in the working gap.

With more complicated discharge current $I_e$ courses other parameters derived from the discharge voltage $U_e$ or the discharge energy may be used to determine the attainment of asymptotic behavior. With a discharge current $I_e$ changing in a linear way, it is possible for instance to monitor when the second derivative in time of the discharge voltage $U_e$ drops below a given threshold value (the curvature of the course of the discharge voltage $U_e$ moving mainly towards zero, respectively the course becoming linear in time).

The duration needed by the pulse to reach this state is not constant, as the speed with which a discharge reaches a defined spark base diameter depends on the macroscopic situation in the gap and on the local geometry within the discharge gap. When for instance from the previous spark discharge some melted material is left locally for a short period and the new discharge takes place close to the previous discharge, less energy and time are necessary to reach the required diameter.

Preferably, the erosion process is optimized by applying the foregoing findings as follows. At first, with the help of empirical measurements for determined values of the (preferably constant) discharge current $I_e$, the corresponding surface roughness is detected, which is reached at the moment when the discharge voltage $U_e$ becomes asymptotic. These value pairs of discharge current $I_e$ and surface roughness are saved as technology parameters in the electric discharge generator, in order to determine the corresponding discharge current $I_e$ to be set by the electric discharge generator for a certain surface roughness to be obtained.

During the machining of a workpiece, for each machining step series of erosion pulses are set with a given discharge current $I_e$ to achieve the desired machining roughness. For each discharge pulse the discharge current $I_e$ will flow until asymptotic behavior of the discharge voltage $U_e$ is detected. At this moment the current density as well as the electrode wear are lowest. Afterwards either the discharge pulse is interrupted or the procedure described subsequently will be used (increase of the discharge current $I_e$) before the interruption. Preferably with these erosion pulses the discharge time (start of the discharge with the increase of the discharge current $I_e$ until the asymptotic behavior of the discharge voltage $U_e$ is obtained) can be increased by a safety factor. In the case of the thus obtained erosion pulses with adaptable discharge time it is possible to speak about isogeometrical pulse periods, as the crater geometry is constant.

After the interruption of the erosion pulse the electric discharge generator introduces an interpulse period which preferably is proportional to the elapsed discharge time. Preferably this interpulse period is a function of the discharge time and the ignition delay time of the previous erosion pulse. The function can be chosen in such a way that the interpulse period is proportional to the discharge time, when the ignition delay time of the previous erosion pulse is greater than a lower threshold value, and that it is a constant value when the ignition delay time is lower than the lower threshold value.

Figure 6:
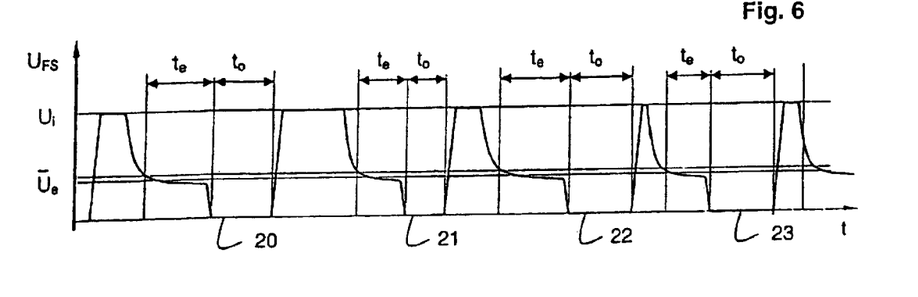
FIG. 6 is a diagram of voltage in time of the erosion pulse, upon which the duration of the pulse depends on discharge time and the ignition delay time, according to a further disclosed embodiment.

FIG. 6 shows three interpulse periods 20, 21, and 22, the duration $t_o$ of which is proportional to the previous discharge time $t_e$. The interpulse period 23 shown in FIG. 6 has a duration $t_o$, that for instance is about the same as the longest period 22 among the periods 20, 21, and 22. Therefore the period 23 is selected greater than for instance the periods 20 and 21 as very often the workpiece material does not solidify completely after evaporation when the ignition delay time is too small. This can lead to a metallization of the electrodes and thus provoke arcing.

For the optional setting of the interpulse period duration a fuzzy logic system or a neuronal network may be used, which besides the named input parameters (ignition delay time $t_d$, discharge time $t_e$) uses further input parameters (for instance conductivity of the gap, frequency of short circuits, instability of process, high-frequency rate during the discharge etc.) to determine the duration of the interpulse period, as there is no simple correlation between the named input quantities and the duration of interpulse period. See the relevant literature, for instance the dissertation by Dirk F. Dauw, "Online Identification and Optimisation of Electro-Discharge Machining" dissertation Katholieke Universiteit Leuven, 1985.

The foregoing measures assure that each discharge pulse shall last only as long as is necessary and the number of erosion pulses per time, and therefore the removal, will be optimized. Expediently a higher removal rate with reduced tool electrode wear, a higher rate of removal of material per erosion pulse, without increasing the surface roughness and without deterioration of the other characteristics that define quality of machining (for instance electrode wear, surface quality, undersize, etc.), is achieved. A further advantage lies in the fact that the gap width remains relatively small, thus achieving the requested quality aims sooner. Furthermore the surface layer, which is damaged by thermal influence during the discharge, is expediently smaller.

If desired, the mentioned measures may be used for roughing as well as for finishing.

A further measure is the use of a special electrical pulse, which increases its current amplitude for a short period just before the end of the pulse, so that at the collapse of the plasma channel the melted material at the cathode-side gets ejected more efficiently and the washing effect is increased. Furthermore an increase of current at the end of the discharge pulse helps prevent re-solidification of the fused phase on the workpiece, and the thermally damaged boundary layer becomes smaller. Thus the total machining time becomes smaller as during the finishing there is less time needed to remove this boundary layer.

Figure 7:
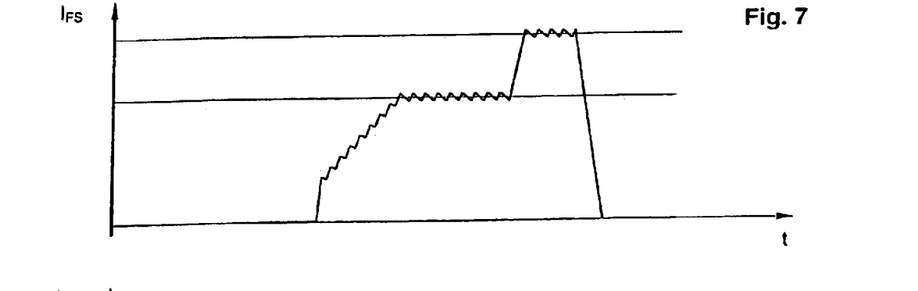
FIG. 7 is a diagram of the current of an erosion pulse, upon which the current value is increased before the interruption of the erosion pulse, according to a further disclosed embodiment.

Such an electrical pulse is shown schematically in FIG. 7, upon which reaching the asymptotic behavior of the discharge voltage the discharge current $I_e$ of the electrical discharge generator is increased for a given period to a value which is higher than the discharge current $I_e$ during discharge (i.e. before reaching the asymptotic behavior of the discharge voltage $U_e$). The relationship between the increased current value and the "normal" discharge current can be set in dependence of the result to be achieved.

Furthermore, the current pulse of the discharge current shows, preferably at the beginning, a gradual increase in the current density (see the current pulse in FIG. 7), limiting in the discharge phase, respectively, at the end of the build-up phase, the electrode wear (see for instance U.S. Pat. No. 5,187,341, the entire disclosure of which is hereby incorporated by reference), and at the end falling flank as steep as possible.

Modern electrical discharge generators are, as described for instance in U.S. Pat. No. 5,280,153, the entire disclosure of which is hereby incorporated by reference, realized in clocked technology. A sole generator can deliver both the slowly increasing current at the beginning and the increase of the current at the end, without supplementary cost for hardware, as the control for the shaping of the current pulses preferentially is implemented in an FPGA (field programmable gate array).

Figure 8:
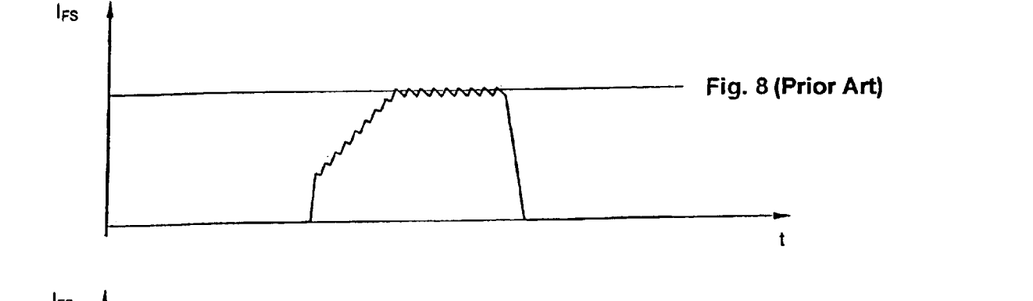
FIG. 8 is a diagram of the current of an erosion pulse, upon which a device to interrupt the erosion pulse is not synchronized with the current control integrated in the electrical discharge generator, according to the prior art.
Figure 9:
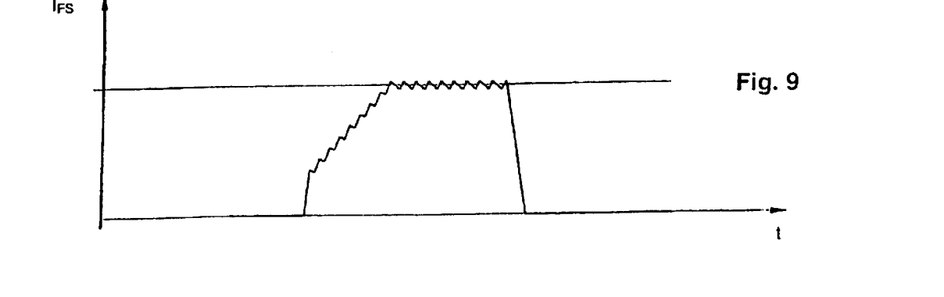
FIG. 9 is a diagram of the current of an erosion pulse, upon which a device to interrupt the erosion pulse is synchronised with the current control integrated in the electrical discharge generator, according to a further embodiment of the disclosure.

As the discharge current $I_e$ is often regulated by switching transistors on and off (transistors hold the discharge current $I_e$ between a lower and a higher given enveloping curve), a current pulse form with a characteristic current ripple is generated, as shown in FIGS. 7–9. Usually the selected rate of rise of the flank of the current ripple will not be too high, to keep the switching frequency as low as possible. As mentioned above, the decreasing current flank at the end of the current pulse should be as steep as possible, to maximize the material removal and favor the washing effect.

Therefore the electrical discharge generator will be thus developed so that the pulse end shall be introduced at such time at which, as shown in FIG. 9, the amplitude of current is highest. This assures that the flank falls as steeply as possible over its entire course.

This becomes evident in a comparison with FIG. 8, which shows an opposite example without this special development of the electrical discharge generator. There the current pulse will be switched off at a low amplitude of current.

The entire falling current flank in FIG. 9 begins with a flat section and terminates only after a determined time (corresponding to half of the period of the current ripple) with the steep section. This unfavorable case leads to an inferior washing effect. However, a good washing effect is needed to form a less rigid and brittle so-called white layer, which develops on the surface of the workpiece under the thermal stress during the erosion process. In principle, a rigid and brittle white layer deteriorates the quality of the surface of the workpiece and therewith, for instance, the life-span of punch tools produced with spark erosion.

The two measures to increase current and ensure a steep falling current flank may of course be combined.

Figure 4:
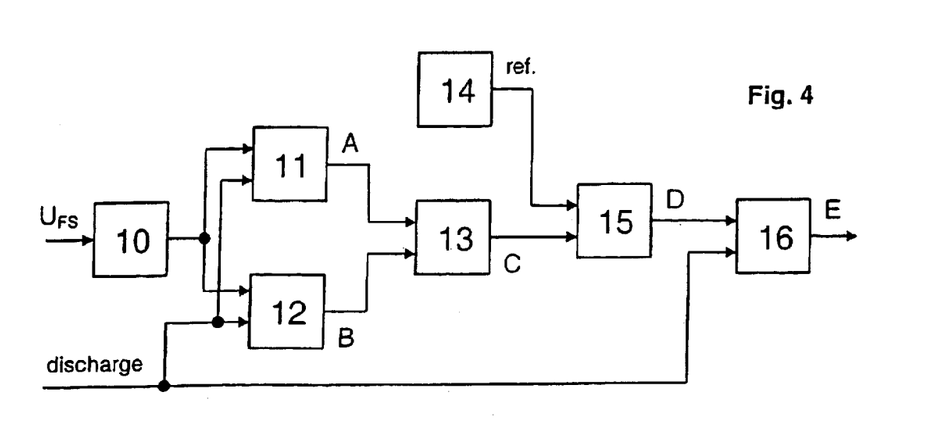
FIG. 4 is a schematic circuit of a device to interrupt the erosion pulse according to a disclosed embodiment.

FIG. 4 shows a schematic basic circuit of a device for adaptive interruption of the current pulse according to a preferred embodiment, developed to capture the time at which the discharge voltage $U_e$ reaches its asymptotic behavior. This device is functionally integrated in an electric discharge generator, as described for instance in U.S. Pat. No. 5,280,153. It comprehends an attenuating element 10, which receives the gap voltage $U_{FS}$ (corresponding to the discharge voltage $U_e$) as input signal, which in general is acquired by the electric discharge generator, and issues this voltage attenuated for instance by a factor 20. The attenuated voltage is then filtered respectively by two low-pass filters 11 and 12 arranged in parallel, whereas the time constant of the low-pass filter 12 is greater than the one of the low-pass filter 11.

During the ignition delay time the output signals of the low-pass filters 11 and 12 are restricted to a maximum value (such maximum value corresponding for instance to a gap voltage of 40 V). Therefore the low-pass filters receive another control signal as an input signal, for instance the signal "discharge," coming from the electric discharge generator, which has a logic low level during the ignition delay time and a logic high level during the discharge time $t_e$ (i.e. during the flow of discharge current). The rising flank of this control signal may be somewhat retarded by a delaying element, in order to correspond for instance to a time at which the discharge current $I_e$ already has a value differing from zero (for instance half of the value of the set maximum discharge current $I_e$ or the maximum value). Thus the control signal of the electric discharge generator can also be determined directly from the discharge current $I_e$, for instance when it has reached its half maximum or maximum value.

Figure 5A:
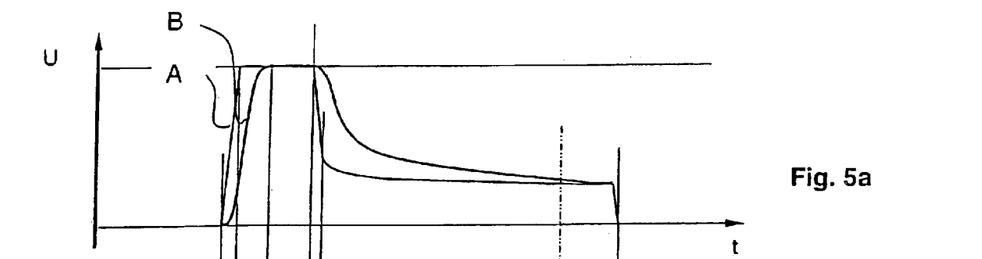
FIG. 5 are diagrams of voltage in time of output voltages of the device of FIG. 4.

The low-pass filters 11 and 12 give the output signals A and B as shown in FIG. 5a (the upper horizontal line represents the above mentioned maximum value). The signal A represents the instantaneous discharge voltage $U_e$, where only noise has been eliminated by the corresponding regulation of the time constant of the low-pass filter 11. By a corresponding regulation of the time constant of the low-pass filter 12, the signal B is a more filtered variant of the signal A, where essentially the transitions have a softer course.

Figure 5B:
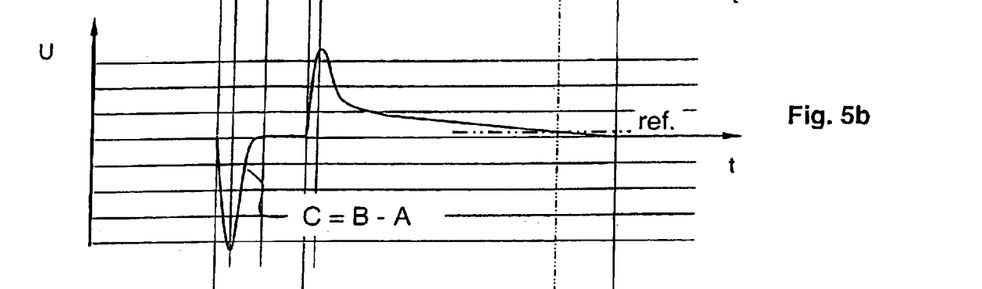

Both signals A and B are subtracted in an operational amplifier 13, which emits a signal C, represented in FIG. 5b. During the discharge phase its course corresponds mainly to the widening gradient of the crater. During idle time the signal C has pulse peaks when reaching idle voltage and at the following voltage drop. Then the signal C is compared in a comparator 15 with a threshold value reference given by a threshold value storage 14.

Figure 5C:
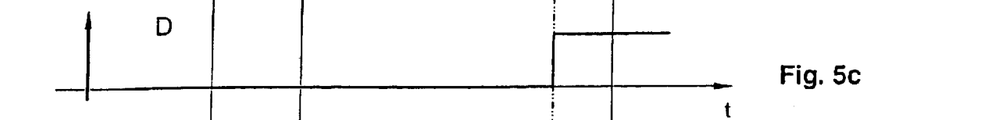
Figure 5D:
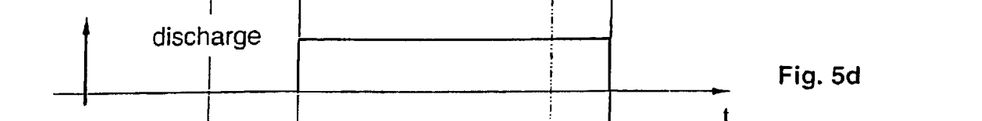
Figure 5E:
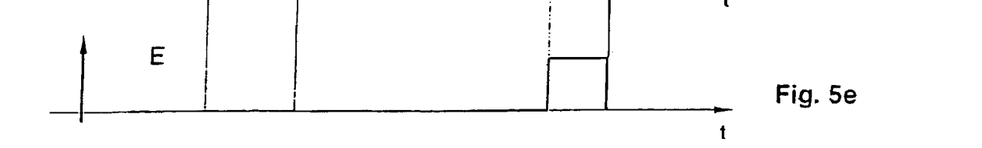

The comparator 15 emits an output signal D shown in FIG. 5c. The signal D is on a logic low level as long as the signal C exceeds the threshold value reference, and on a logic high level in the opposite case (FIG. 5c does not show the logic high levels, which the signal D actually takes on also during ignition delay time; eventually these might be suppressed already in the comparator 15, while the latter also receives the control signal "discharge" as input signal and keeps its output on a logic low level, as long as the control signal "discharge" is on a logic low level).

The signal D is put into an AND element 16, which as further input receives the control signal "discharge" from the electric discharge generator. The signal "discharge" is, as mentioned, on a logic high level as long as the discharge is in course and a discharge current $I_e$ is flowing. The AND element 16 emits an output signal E, which indicates with an increasing flank from the logic low level to the logic high level, that the asymptotic behavior of the discharge voltage $U_e$ has been reached, and also indicates with a decreasing edge from the logic high level to the logic low level, that the discharge is terminated.

This particular cut-off of the current pulse is very easy to realize in analog technology. It is of course also feasible in digital technology, while the above-mentioned functions of its single components are coded, for instance, in a so-called FPGA-component (for example of the firm Xilinx, Inc., 2011 Logic Drive, San José, Calif. 95124). Alternatively, other circuit variants to determine the time, when the asymptotic behavior of the discharge voltage $U_e$ is reached, are conceivable. For instance a simple accordingly adjusted high-pass filter, which receives the discharge voltage $U_e$ as input value during the discharge time, can deliver an output value, which is significant upon reaching an approximately constant course of the discharge voltage $U_e$.

The overall discharge time, its beginning being indicated by an increasing flank of the "discharge" signal and its end by an increasing flank of the signal E, can preferably be used to divert further information (for instance upon a short discharge time only one peak is eroded etc.) about the instantaneous spark discharge machining and to adjust eventually further erosion parameters depending on the determined discharge duration.

What is claimed is:

1. Method for electrical discharge machining of a workpiece with a tool electrode, comprising the steps of:
    applying an erosion pulse on the tool electrode,
    acquiring a voltage ($U_e$) applied on the tool electrode during the duration of erosion phase;
    detecting an asymptotic behavior of the acquired voltage ($U_e$) or a value derived therefrom; and
    interrupting the erosion pulse after the asymptotic behavior has been detected.

2. The method of claim 1, wherein the value derived from the asymptotic behavior is selected from the group consisting of discharge power and the ratio of acquired voltage to simultaneously flowing current.

3. The method of claim 1, comprising controlling the discharge current ($I_e$), which upon discharge flows to the tool electrode during the duration of the erosion pulse, by means of respective upper and lower enveloping curves, so that the discharge current ascends and descends between said enveloping curves, and interrupting the erosion pulse at a moment at which the current value of the discharge current ($I_e$) is at a maximum.

4. The method of claim 1, comprising controlling a discharge current ($I_e$), which upon discharge flows to the tool electrode at least during a fraction of the duration of the erosion pulse, to maintain a constant value of the discharge current, and detecting the asymptotic behavior as the instant at which the derivative in time of the detected voltage ($U_e$) falls below a given threshold (reference) value.

5. The method of claim 4, comprising detecting the beginning of a discharge and, after interrupting the erosion pulse, introducing an interpulse period with a first duration ($t_0$), which depends on a second duration ($t_e$) defined as the time between the beginning of the discharge and the detection of the asymptotic behavior of the previous erosion pulse.

6. The method of claim 5, wherein the first duration ($t_0$) further depends on an ignition delay time ($t_i$), which is defined as time between the application of the erosion pulse and the beginning of the discharge.

7. The method according to claim 6, comprising assigning the first duration ($t_0$) a minimum value should the ignition delay time ($t_i$) fall below a threshold value.

8. The method of claim 5, comprising controlling the discharge current ($I_e$), which upon discharge flows to the tool electrode during the duration of the erosion pulse, and increasing the discharge current to a given current value, during a third duration, which starts after the asymptotic behavior is detected and ends when the erosion pulse is interrupted.

9. The method of claim 5, wherein the first duration ($t_0$) is proportional to the second duration ($t_e$).

10. The method of claim 5, comprising setting further erosion parameters, depending on the second duration ($t_e$), which is defined as the time between the beginning of the discharge and the detection of the asymptotic behavior at the previous erosion pulse.

11. Apparatus for electrical discharge machining of a workpiece with an electrical discharge generator to produce erosion pulses to be applied on a tool electrode, wherein during the erosion pulse applied on the tool electrode the apparatus acquires the voltage ($U_e$) applied on the tool electrode, said apparatus comprising a device connected to the electrical discharge generator adapted to cause the electrical discharge generator to interrupt an erosion pulse, after detecting an asymptotic behavior of the acquired voltage ($U_e$) or of a value derived from it.

12. The apparatus of claim 11, wherein the value derived from the asymptotic behavior is selected from the group consisting of discharge power and the ratio of acquired voltage to simultaneously flowing current.

13. The apparatus of claim 11, wherein the electrical discharge generator, after an interrupted erosion pulse, detects the beginning of a discharge and introduces an interpulse period with a first duration ($t_0$), which depends on a second duration ($t_i$), defined as the time between the beginning of the discharge and the detection of the asymptotic behavior at the previous erosion pulse.

14. The apparatus of claim 13, wherein the electrical discharge generator controls the discharge current ($I_e$), which at discharge flows to the tool electrode during the duration of an erosion pulse, in such way that it increases the discharge current to a given value during a third duration, which starts after detection of the asymptotic behavior and ends with the interruption of the erosion pulse.

15. The apparatus of claim 11, wherein the electrical discharge generator controls the discharge current ($I_e$), which upon a discharge flows to the tool electrode during the duration of an erosion pulse, with respective upper and lower enveloping curves, so that the discharge current ($I_e$) ascends and descends between said enveloping curves and interrupts the erosion pulse at a time when the value of the discharge current ($I_e$) is highest.

16. Method for electrical discharge machining of a workpiece with a tool electrode, comprising the steps of:

applying an erosion pulse on the tool electrode, acquiring a voltage ($U_e$) applied on the tool electrode during the duration of erosion phase;

detecting an asymptotic behavior of the acquired voltage ($U_e$) or a value derived therefrom; and interrupting the erosion pulse during normal discharge processes after the asymptotic behavior has been detected.

17. Apparatus for electrical discharge machining of a workpiece with an electrical discharge generator to produce erosion pulses to be applied on a tool electrode, wherein during the erosion pulse applied on the tool electrode the apparatus acquires the voltage ($U_e$) applied on the tool electrode, said apparatus comprising a device connected to the electrical discharge generator adapted to cause the electrical discharge generator to interrupt an erosion pulse during normal discharge processes, after detecting an asymptotic behavior of the acquired voltage ($U_e$) or of a value derived from it.

* * * * *